(12) United States Patent
Gonsalves et al.

(10) Patent No.: US 8,606,652 B2
(45) Date of Patent: Dec. 10, 2013

(54) TOPICAL PAGE LAYOUT

(75) Inventors: Michael F. Gonsalves, Minneapolis, MN (US); Gregory M. Nations, Minneapolis, MN (US); Chad R. Gourley, Elk River, MN (US); Patricia Korth-McDonnell, Brooklyn, NY (US); Sarah E. Schoeffler, Minneapolis, MN (US); Joe Stewart, Brooklyn, NY (US)

(73) Assignee: Target Brands, Inc., Minneapolis, MN (US)

( * ) Notice: Subject to any disclaimer, the term of this patent is extended or adjusted under 35 U.S.C. 154(b) by 72 days.

(21) Appl. No.: 12/973,871

(22) Filed: Dec. 20, 2010

(65) Prior Publication Data

US 2012/0158537 A1 Jun. 21, 2012

(51) Int. Cl.
*G06Q 30/00* (2012.01)

(52) U.S. Cl.
USPC .......................................... 705/26.7; 705/26.1

(58) Field of Classification Search
USPC .................................... 705/26–27, 26.1–27.2
See application file for complete search history.

(56) References Cited

U.S. PATENT DOCUMENTS

| | | | |
|---|---|---|---|
| D109,791 S | 5/1938 | Sonin | |
| 5,423,139 A | 6/1995 | Feldman | |
| 5,644,735 A | 7/1997 | Luciw et al. | |
| 5,956,709 A | 9/1999 | Xue | |
| D415,483 S | 10/1999 | Decker | |
| 6,014,634 A | 1/2000 | Scroggie et al. | |
| 6,026,376 A | 2/2000 | Kenney | |
| 6,032,130 A | 2/2000 | Alloul et al. | |
| 6,055,573 A | 4/2000 | Gardenswartz et al. | |
| 6,141,666 A | 10/2000 | Tobin | |
| 6,182,871 B1 | 2/2001 | Lam | |
| 6,216,139 B1 | 4/2001 | Liston | |
| 6,298,330 B1 | 10/2001 | Gardenswartz et al. | |
| 6,542,927 B2 | 4/2003 | Rhoads | |

(Continued)

FOREIGN PATENT DOCUMENTS

| | | |
|---|---|---|
| CA | 2714783 A1 | 6/2011 |
| EP | 2015245 | 1/2009 |

(Continued)

OTHER PUBLICATIONS

Canon Digital Rebel XT Review (www.dcviews.com, Jul. 4, 2007, 5 pages).*

(Continued)

*Primary Examiner* — Jeffrey A Smith
*Assistant Examiner* — Ethan D Civan
(74) *Attorney, Agent, or Firm* — Merek, Blackmon & Voorhees, LLC (57) ABSTRACT

In some implementations, a product category web page includes a middle region with recommend products and topical information. The middle region optionally includes three columns with recommend products in the center column and topical information in the outer columns. In some implementations, the topical information is associated with the product category. The topical information in certain embodiments helps a search engine determine product results for a natural language query and the product results are presented in the product tile array. In one implementation, the product web page is a product specific web page. The product specific web page may include an upper region with a horizontal rotating product carousel. The product carousel optionally permits a user to select and view information relating to products in a product category or products that are related to each other.

19 Claims, 7 Drawing Sheets

(56) References Cited

U.S. PATENT DOCUMENTS

| | | | |
|---|---|---|---|
| 6,604,681 | B1 | 8/2003 | Burke et al. |
| 6,766,212 | B1 | 7/2004 | Dean |
| 6,965,376 | B2 | 11/2005 | Tani et al. |
| 7,002,573 | B2 | 2/2006 | Trotta et al. |
| 7,010,876 | B1 | 3/2006 | Siegel et al. |
| 7,055,130 | B2 | 5/2006 | Charisius et al. |
| 7,062,453 | B1 | 6/2006 | Clarke |
| 7,263,499 | B2 | 8/2007 | Kunigita |
| 7,284,206 | B2 | 10/2007 | Ozawa et al. |
| 7,409,362 | B2 | 8/2008 | Calabria |
| 7,503,502 | B2 | 3/2009 | Montague |
| D590,412 | S | 4/2009 | Saft et al. |
| 7,529,797 | B2 | 5/2009 | Tseng et al. |
| D599,373 | S | 9/2009 | Kobayashi et al. |
| 7,603,292 | B1 | 10/2009 | Bragg et al. |
| 7,613,687 | B2 | 11/2009 | Nye |
| 7,676,387 | B2 | 3/2010 | Childress et al. |
| 7,702,542 | B2 | 4/2010 | Aslanian |
| D619,613 | S | 7/2010 | Dunn |
| D622,280 | S | 8/2010 | Tarara |
| D625,323 | S | 10/2010 | Matsushima et al. |
| D626,133 | S | 10/2010 | Murphy et al. |
| 7,890,378 | B2 | 2/2011 | Clarke et al. |
| 7,996,282 | B1 | 8/2011 | Scott et al. |
| 8,001,003 | B1 | 8/2011 | Robinson et al. |
| D644,663 | S | 9/2011 | Gardner et al. |
| D656,950 | S | 4/2012 | Shallcross et al. |
| 8,244,590 | B2 | 8/2012 | Rothman |
| 8,250,145 | B2 | 8/2012 | Zuckerberg et al. |
| 2001/0029465 | A1 | 10/2001 | Strisower |
| 2002/0046105 | A1 | 4/2002 | Gardenswartz et al. |
| 2002/0165799 | A1 | 11/2002 | Jaffe et al. |
| 2003/0014501 | A1 | 1/2003 | Golding et al. |
| 2003/0050848 | A1 | 3/2003 | Defayette et al. |
| 2005/0055321 | A1 | 3/2005 | Fratkina et al. |
| 2005/0081251 | A1 | 4/2005 | Walker et al. |
| 2005/0144093 | A1 | 6/2005 | Kassan |
| 2005/0147054 | A1 | 7/2005 | Loo et al. |
| 2005/0149269 | A1 | 7/2005 | Thomas et al. |
| 2006/0053066 | A1 | 3/2006 | Sherr et al. |
| 2006/0103130 | A1 | 5/2006 | Koivukunnas et al. |
| 2006/0277103 | A1 | 12/2006 | Fujita et al. |
| 2006/0277477 | A1 | 12/2006 | Christenson |
| 2007/0022020 | A1 | 1/2007 | Bernstein |
| 2007/0078850 | A1 | 4/2007 | Aziz et al. |
| 2007/0095615 | A1 | 5/2007 | Spector |
| 2007/0162850 | A1 | 7/2007 | Adler et al. |
| 2007/0192168 | A1 | 8/2007 | Van Luchene |
| 2007/0226189 | A1 | 9/2007 | Piekos et al. |
| 2007/0244883 | A1 | 10/2007 | Bessieres et al. |
| 2007/0244900 | A1 | 10/2007 | Hopkins et al. |
| 2007/0300261 | A1 | 12/2007 | Barton et al. |
| 2008/0005125 | A1 | 1/2008 | Gaedeke |
| 2008/0077487 | A1 | 3/2008 | Davis et al. |
| 2008/0097844 | A1 | 4/2008 | Hsu et al. |
| 2008/0147640 | A1 | 6/2008 | Schachter |
| 2008/0235085 | A1 | 9/2008 | Kovinsky et al. |
| 2008/0255962 | A1 | 10/2008 | Chang et al. |
| 2008/0270248 | A1 | 10/2008 | Brill |
| 2008/0270250 | A1 | 10/2008 | Bolivar et al. |
| 2009/0037355 | A1* | 2/2009 | Brave et al. ............. 706/45 |
| 2009/0106085 | A1 | 4/2009 | Raimbeault |
| 2009/0106113 | A1 | 4/2009 | Arora et al. |
| 2009/0132388 | A1 | 5/2009 | Omori et al. |
| 2009/0164315 | A1 | 6/2009 | Rothman |
| 2009/0164323 | A1 | 6/2009 | Byrne |
| 2009/0171812 | A1 | 7/2009 | Fadell |
| 2009/0173792 | A1 | 7/2009 | Montague |
| 2009/0199115 | A1 | 8/2009 | Singh |
| 2009/0265968 | A1 | 10/2009 | McNamee |
| 2009/0273612 | A1 | 11/2009 | Xie |
| 2009/0292599 | A1 | 11/2009 | Rampell et al. |
| 2009/0299965 | A1 | 12/2009 | Aziz et al. |
| 2009/0307100 | A1 | 12/2009 | Nguyen et al. |
| 2010/0114720 | A1 | 5/2010 | Jones et al. |
| 2010/0179876 | A1 | 7/2010 | Holte |
| 2010/0186066 | A1 | 7/2010 | Pollard |
| 2010/0223082 | A1 | 9/2010 | Becker et al. |
| 2010/0250336 | A1* | 9/2010 | Selinger et al. ............. 705/10 |
| 2011/0029368 | A1 | 2/2011 | Hsu et al. |
| 2011/0125569 | A1 | 5/2011 | Yoshimura et al. |
| 2011/0153451 | A1* | 6/2011 | Bitz et al. ............. 705/26.7 |
| 2011/0173095 | A1 | 7/2011 | Kassaei et al. |
| 2011/0225152 | A1 | 9/2011 | Beaudreau et al. |
| 2011/0302498 | A1 | 12/2011 | Gorodyansky |
| 2012/0166945 | A1 | 6/2012 | Roberts et al. |

FOREIGN PATENT DOCUMENTS

| | | |
|---|---|---|
| WO | WO 01/079446 | 12/2000 |
| WO | 01/045020 | 6/2001 |
| WO | 2001/084447 | 11/2001 |
| WO | WO0203268 | 1/2002 |
| WO | 2005/066844 | 7/2005 |
| WO | WO2006101348 | 9/2006 |
| WO | 2007/005431 | 1/2007 |

OTHER PUBLICATIONS

Kohls [Online], Dec. 20, 2010, Retrieved from the Internet at: http://www.kohls.com/upgrade/webstore/home.jsp;jsessionid=3cSgNPpTqV8tRh32vBzDf2q12xQJzpWQjD5Mpnrqlp3wtMX81Psn!-1748685949!105707934, 2 pages.

Sonystyle, [Online], Dec. 13, 2009, Retrieved from the Internet at: http://www.sonystyle.com/webapp/wcs/stores/servlet/StoreCatalogDisplay?langId=-1&storeId=10151&catalogId=10551&eid=372683003, 2 pages.

OfficeMax, Laptop Notebook Computers: New Laptop Computers, Wireless Laptop Computers, [Online], Dec. 13, 2009, Retrieved from the Internet at: http://www.officemax.com/technology/computers/laptop-computers, 3 pages.

Best Buy, Every Day Laptops, [Online], Dec. 13, 2009, Retrieved from the Internet at: http://www.bestbuy.com/site/Laptop-Computers/Everyday-Laptops, 4 pages.

Han, Taedong, Exploring Price and Product Information Search Behavior in e-Market, Proceedings of the International Conference on Information Technology: Coding and Computer, Mar. 2005, 6 pages.

Lin, Wen-Shan et al., Understanding Consumer Search Activity and Online Purchase Intensions for Improving the Product Recommendation Search, 6th IEEE/ACIS International Conference on Computer and Information Science, Apr. 2007, 6 pages.

Huge, Target Patents, Target Patent Annotations, PowerPoint Slides, Mar. 28, 2011, 35 pages.

Maldonado, Robert T., Letter to Gardella, Greg H., Re: Inventor Declarations from Huge Inventors, Mar. 31, 2011, 2 pages.

Gardella, Greg H., Letter to Robert T. Maldonado, Re: HUGE Inventors for Target Brands, Inc. Patent Applications, Apr. 11, 2011, 5 pages.

Office Action from Canadian Patent Application No. 2,761,560, mailed Apr. 18, 2013 (3 pages).

Amazon, Prime Eligible Under $25, [Online], Dec. 19, 2009, Retrieved from the Internet at: http:l/www.amazon.com/s/Znode=2238906011&field%2dprice=%2d2500&p%5f76=1, 4 pages.

Amazon, Recommended for You, [Online], Dec. 21, 2009, Retrieved from the Internet at https:l/www.amazon.com/gp/yourstore?ie=UTF8&ref__=pd%5Firi%5Fgw, 3 pages.

Amazon, search Results for Columbia 100% cotton Towels, Retneved Aug. 10, 2011 from the Internet at: http://www.amazon.com/gp/search/ref=sr_nr_scat_10789941_1n?rh=n%3A10789941%2Ck%3Acotton+bath+towels&keywords+cotton+bath+towels&ie=UTF8&qid=1312572186&scn=10789941&h=5ec5aedf63cc88f6e48fda6b27c85681 ae 7a21 ba, 6 pages.

Amazon.com Universal Wish List, [Online]. Dec. 20, 2010, Retrieved from the Internet at: http://www.amazon.com/b/?ie=UTF8&node=2223317011&tag=googhydr-20&hvadid=3877744091&ref=pd_sl_37ck7ovrfc_b, 3 pages.

(56) References Cited

OTHER PUBLICATIONS

Bedding & Bath, http://fvvww.kohls.com/kohlsStore/bedandbath/towels/decorativetowels.jsp?bmForm=guided_nav-search&Subcat FolderiD=2534374752660882, at least as early as Mar. 29, 2011 (2 pages).
BestBuy, Search Results for iT, Retrieved Aug. 5, 2011 from the Internet at: http:f/www.bestbuy.com/site/olspage.jsp;jsessionid=9B6687FFBB3C82, 8 pages.
Office Action from Canadian Patent Application No. 2.761,936, mailed Jul. 16, 2012 (3 pages).
Office Action from Canadian Patent Application No. 2.761,936, mailed Nov. 21, 2012 (3 pages).
Office Action from Canadian Patent Application No. 2.761,936, mailed Apr. 18, 2013 (3 pages).
Office Action from Canadian Patent Application No. 2,781,784, mailed Nov. 27, 2012 (4 pages).
Eddie Bauer.com [Online] Dec. 20, 2010, Retrieved from the Internet at: https://www.eddiebauer.com/checkout/bag.jsp?&pcategoryId=95&categoryName=SWEATERS--CARDIGANS&pCategoryId=3&pCategoryName=WOMEN&gpCategoryId=1&gpCategoryName=EB#ppl=%7Btype%3A%22transition%22%2Censemblel d%3A%2236211%22%2CformatStr%3A%22product%22%2CpassedId0bj%3A%7B%22ensembleld%3A%2236211%22%7D%2CcategoryId%3A%2227411%22%2CpathInfo%3A%22undefined%.
Etihad Airways Home Page, Retrieved Aug. 10, 3011 from the Internet at: http://www.etihadairways.com/sites/etihad/us/en/home/pages/home_aspx?cid=ppc _start, 1 page.
Facebook Adds Profile Preview Feature [Online], Jan. 7, 2010, Retrieved from the Internet at: http://www.allfacebook.com/facebook-adds-profile-preview- feature-2008-09, 5 pages.
Facebook Developers Facebook Connect, Build and grow with Facebook Connect, [Online] Dec. 18, 2009, Retrieved from the Internet at: http://developers.facebook.com/connecl.php, 2 pages.
Google Product search results for "Canon Powershot", Retrieved Mar. 5, 2010 from the Internet at: http://www.google.com/products?q=canon+powershot&aq=O&oq=canon+p, 3 pages.
Grannell, Craig, .net/techniques, /CSS/create a navigation bar, Sep. 2, 2007, 4 pages.
HP Support, Search Results for "HP Pavilion dv7t-1 000" I FAQ, Retrieved Mar. 25, 2010 from the Internet at: http://h10061.www1.hp.com/ccsearch/search?pname=H P+Pavilion+dv7t-1000+CTO+Ent, 1 page.
Just-Style: connecting to consumers, [Online], Sep. 16, 2002, Retrieved from the Internet at: http://www.just-style.com/articleprinl.aspx?id=93012 on Dec. 19, 2009,4 pages.
Kitchen & Dining, http:/fvvww.amazon.com/kitchen-dining-small-appliances-cookware/b?ie=UTF8&node=284507, at D/S.L./ least as early as Jan. 28, 2011 (3 pages).
Kohls, Search Results for "bath towel", Retrieved Aug. 5, 2011 from the Internet at: http://www.kohls.com/upgrade/webstorelhome.jsp;jsessionid=2W1QTB, 3 pages.
Logictech Mouse Home Page, Retrieved Aug. 10, 2011 from the Internet at: http://www.logitech.com/en-us/mice-pointers/mice, 13 pages.
Muspy, Artists [Online], Jan. 7, 2010, Retrieved from the Internet at: http://www.muspy.com/artists, 2 pages.
Online Pharmacy for Prescription Drugs- CVS Pharmacy Drug Store [Online], Dec. 21, 2009, Retrieved from the Internet at: http://www.cvs.com/CVSApp/user/home/home.jsp, 2 pages.
Organize.com, Kitchen, [Online], Dec. 20, 2009, Retrieved from the Internet at: http://www.organize.com/kitchen.html, 4 pages.
Pet, CSN Stores, [Online], Dec. 20, 2009, Retrieved from the Internet at http://www.csnstores.com/Pet-C216358.html, 2 pages.
"Priceless Promotions," by Samantha Murphy, Chain Store Age 84. 10 (Oct. 2008): 58.
"Processors-Desktops," http ://fvvww. neweg g. com/Store/SubCategory .aspx? SubCategory=34 3&nam e= Processors- Desktops, at least as early as Dec. 30, 2010 (1 page).
Sam's Club, [Online], Dec. 21, 2009, Retrieved from the Internet at: http://www.samsclub.com/shopping/index.jsp, 3 pages.
Sony Notebook Home Page, Retrieved Aug. 10, 2011 from the Internet at: http://store.sony.com/webapp/wcs/stores/servlet!CategoryDisplay?catalogId= 1 0551 &storeId= 1 0151 &langId=-1 &categoryId=16154&SR=nav: electronics: computers:laptops: shop_compare:ss&ref=http%3A%2F%2Fwww.sony.cone%2Findex.php, 5 pages.
Tom's Hardware Home Page, Tom's Hardware: Hardware News, Tests and Reviews, Retrieved Mar. 4, 2010 from the Internet at:: http://www.tomshardware.com/us/#redirect, 3 pages.
Walmart, [Online], Dec. 21, 2009, Retrieved from the Internet at: http://www.walmart.com, 2 pages.
Yahoo! Small Business, Effective Navigation Bar Design, [Online], Dec. 21, 2009, Retrieved from the Internet at: http://sma llbusiness.yahoo .com/r- pfp-a- 40931-m-6-sc-37 -effective_navigation_b ar_ design .html, 1 page.
Jan. 28, 2013 Office Action, U.S. Appl. No. 12/973,651.
Mar. 18, 2013 Office Action, U.S. Appl. No. 12/887,098.
BabiesRus, Baby Gifts—Baby Registry at BabiesRus, [Online], Dec. 20, 2010, Retrieved from the Internet at: http://www.toysrus.com/registry/index.jsp, 1 page.
Crate&Barrel, [Online], Dec. 20, 2010, Retrieved from the Internet at: http://www.crateandbarrel.com/gift-registry/, 1 page.
Amazon.com, [Online], Dec. 20, 2010, Retrieved from the Internet at: http://www.amazon.com/gp/wedding/homepage/ref=sv_cm_gft_5, 1 page.
Macy's, [Online], Dec. 20, 2010, Retrieved from the Internet at: http://macys.com/registry/wedding/registryhome, 1 page.
http://www.target.com, Target Brands, Inc., Archived on Jul. 14, 2009, retrieved from web.archive.org/web/20090714060557/http://www.target.com, p. 1-84.
Kalbach, Designing Web Navigation, O'Reily Media, Aug. 2007, pp. 73-74; p. 90.
Meloni, Sams Teach Yourself HTML and CSS in 24 Hours, 8th ed., Sams Publishing, Dec. 2009, p. 361.
Van Duyne et al., The Design of Sites: Patterns for Creating Winning Web Sites, 2nd ed., Prentice Hall, 14, Dec. 2006, p. 677-758.
Cohen, The Unusually Useful Web Book, New Riders Publishing, Jun. 2003, p. 113-114.
Poem entitled "i carry your heart with me (i carry it in," by E.E. Cummings [On-line], Poem dated 1920. Retrieved from Internet 06-03-2-13. URL>http://en.wikipedia.org/wiki/E._E_Cummings<.. (12 pages, see p. 5).
Office Action from Canadian Patent Application No. 145,725 mailed Oct. 1, 2012 (1 page).
Steve Eastman Presentation, Target Manages Meeting, Mar. 15, 2010.
TGT—Target Financial Community Meeting, Jan. 21, 2010.

* cited by examiner

FIG. 1

*200a* car seats *224*

*204a* *204b*

① safety first.  ② types of seats.  ③ how to choose.  ④ installation.

harness    infant                             child weight    assembly
latch       convertible                 features        position
transport   booster                       brand   *208*  car latches
                           *206*                                                 *202* safety & durability.

Five-Point Harness
The safest choice because the straps secure a little one at the shoulders and hips, their body's strongest parts.

So Big!
Infant car seats are appropriate until your baby is at least one year old and weighs 20 lbs. or more. Most convertible car seats accommodate newborns and toddlers up to about 40 lbs. rear-facing, then work as forward-facing booster seats for children up to 80 lbs.

*210*

( register your seat )

the top three

78% love it!   Brand A
$189.99
★★★★★
read the review.

Brand B
$199.99
★★★★★
read the review.

Brand C
$209.99
★★★★★
read the review.

*218*             *216* design & features.

Tether
Most new forward-facing and some rear-facing car seats come with a snap-on tether that connects behind your rear-seat headrest, offering additional stability.

Extras
The newest car seats are safe, comfortable, and have double checks to ensure yours is installed correctly. Check out sippy cupholders, warm bunting, and luxury or leather upholstery.
*212* installation.

Watch the video below to learn about car seat installation.

*214*

( price low to high ) ( most popular ) ( most durable )   top 20 of 204 car seats *222*

300a 299.99  308
Reg. 399.99

Brand J Model A

The Brand J Model A digital SLR was designed with entry-level DSLR users in mind.

In stock in your local store
Quantity: [1]

(add to cart.)  (add to list. ▼)

e-mail me when this camera goes on sale.   share this camera.

306

354

304b

Brand K Model A Digital Camera | Brand L Model A 250mm Telephoto Zoom Lens | Brand K Model B 400D Digital Camera   304a  310  Brand L Soft Case Camera Bag

302

Cast your vote.   312

| | | |
|---|---|---|
| overall. | ★★★★ · 314 | |
| ease of use. | ★★★★ · 316 | 74% of rates said this camera is easy to use. |
| durability. | ★★★ · 318 | |
| style. | ★★★ · 320 | #1 top rated camera for style in the category. |

What do your friends think?   322 owns it
owns it pros 83%    cons 17% features.

Megapixels: 14.7

Camera Features: instant Power-up, Optical image Stabilization, Live View

Display Size: 3.0"

Optical Zoom: 4.0x

Image types: JPEG, RAW

324

Journal A picks for a:
virtual photo booth!

| pros | cons |
|---|---|
| 83% | 17% |

328 — i love this camera. i think it's perfect for everything from family parties to serious photography nerds.
Posted by: natisnat   Overall: ★★★★★ this camera is heavy. the user interface is not at all intuitive.
Overall: ★★★★★   Posted by: Shirley — 330 this is simple enough for the kids to use, while powerful enough to entertain a budding photographer.
Posted by: mimi2   Overall: ★★★★★ so far, so good. it has taken a few decent drops without issue, and the photos are great.
Posted by: offroad   Overall: ★★★★★ the camera arrived damaged. i have been having a terrible time obtaining a replacement.
Overall: ★☆☆☆☆   Posted by: Mabel i got to borrow this camera while on vacation, and it is on my wish list! great product.
Posted by: redblu   Overall: ★★★★★

332 ( see more reviews )
340
326

Journal A's picks for a:
virtual photo booth!
(flawless!)

Journal A says:
"Whether it's pictures of your friends or dramatic landscapes, this setup will make the most of your photos."
334 how do you use it? (9)   356 all 9 photos   ♡|●  336 check out the competition.
Brand L Model B digital slr with 10.2 MP, AF-S DX
99.99
Reg. 129.99
338 the art of the image collection.
342 the world of cameras.
( price low to high ) ( most popular ) ( highest rated )   top 20 of 204 cameras  346

TOPICAL PAGE LAYOUT

BACKGROUND

A user employs a web browser to view web pages on the Internet while searching for information. Search engines allow the user to more easily find the information the user is looking for. Some search engines provide links to web pages for a specific web site and others provide links to multiple web sites. For instance, the user searches using a search engine provided by a specific web site.

A user can search for information relating to products or services in order to find out more about those products or services. The user views buying guides, FAQs, and reviews about the products or services they are looking for.

A user can purchase products or services over the Internet from an e-commerce site. Some e-commerce sites ship purchased products to customers. Some e-commerce web sites allow a user to request a service person to come to the user's home. Some e-commerce web sites allow a user to purchase a product and pick up the product at a retail store.

E-commerce web sites use servers to store web pages. A server receives a request for a web page from a user and provides the web page or information relating to the web page to the user. The server can store user account information in order to provide better service to the user.

SUMMARY

In selected embodiments, a product category web page and product specific web page facilitates user interaction with the content presented below the lower boundary viewable on a conventional display monitor when the monitor is at the uppermost scroll position. In some implementations, a product web page includes a product tile array in a lower region of the web page, wherein the product tile array presents information about products in a product category. The product tile array may be located on a portion of the product web page that is not initially presented on a display when the product web page is presented so as to encourage a user to scroll down the webpage. In some implementations, the ratio of the height to the width of the product web page is at least 4:1 or greater.

In one implementation, the product web page is a product category web page. The product category web page includes a plurality of data tile regions in an upper portion of the product category web page. The data tile regions include a main product image of a representative product for the product category. The main product image is located horizontally in the center of the product category web page. The data tile regions include information associated with the product category, e.g., setup instructions, buying guides, or a list of product sub-categories.

In some implementations, the product category web page includes a middle region with recommend products and topical information. The middle region includes three columns with recommend products in the center column and topical information in the outer columns. In some implementations, the topical information is associated with the product category. In some implementations, the topical information helps a search engine determine product results for a natural language query and the product results are presented in the product tile array.

In one implementation, the product web page is a product specific web page. The product specific web page includes an upper region with a horizontal rotating product carousel. The product carousel allows a user to select and view information relating to products in a product category or products that are related to each other.

In some implementations, the product specific web page includes a middle region with review information, detailed product information, product images, and comparable products. The middle region includes two columns with user reviews and a widget bar in a left column and detailed product information, third party reviews, user product images, and comparable products in a right column. In some implementations, the widget bar allows a user to enter product review information about the product displayed on the product specific web page.

The details of one or more implementations are set forth in the accompanying drawing and description below. Other features, objects, and advantages will be apparent from the description and drawings, and from the claims.

DESCRIPTION OF DRAWINGS

Like reference symbols in various drawing indicate like elements.

DETAILED DESCRIPTION OF ILLUSTRATIVE IMPLEMENTATIONS

A product web page presents information to a user about a depicted product or product category. In some implementations, the user searches for a product category or a specific product (e.g., by product or category name). The user views the results of the search and selects a product to view additional information about the product. The product web page includes the results of the search at the bottom of the product web page. In some implementations, the user browses to a product web page in order to view information about the product or product category.

In some implementations, a product web page includes information relating to a product category above a tiled product array. In some implementations, the tiled product array presents the results of a keyword search. For example, topical materials and highly recommended products are presented in a tri-column format above the tiled product array.

In some implementations, topical materials help a search engine determine search results for a natural language query. For example, the search engine determines that keywords from a query or search string are related to specific topical materials. Based on the topical materials, the search engine determines a product category a user is looking for and creates a web page with search results in a product tile array below the topical materials.

In some implementations, the product web page includes product details, reviews, product images, and comparable products. For example, the product web page includes a two-column format with user reviews in the left hand column. A user is able to add a product review and view other reviews. In some implementations, the user views reviews from people socially connected to the user. In some implementations, the right hand column includes product details, third party reviews, user images of the product, and a comparable product. In some implementations, a tile array of comparable products is presented on a bottom portion of the product web page.

In some implementations, the comparable products (e.g., search results) are presented on a portion of a web page that is typically below a lower boundary of a display. For example, a user needs to scroll down in a web browser in order to view the tile array. Presentation of comparable products provides significant information at the bottom of the product web page and increases the likelihood that a user will view information at the bottom of the page.

Figure 1:
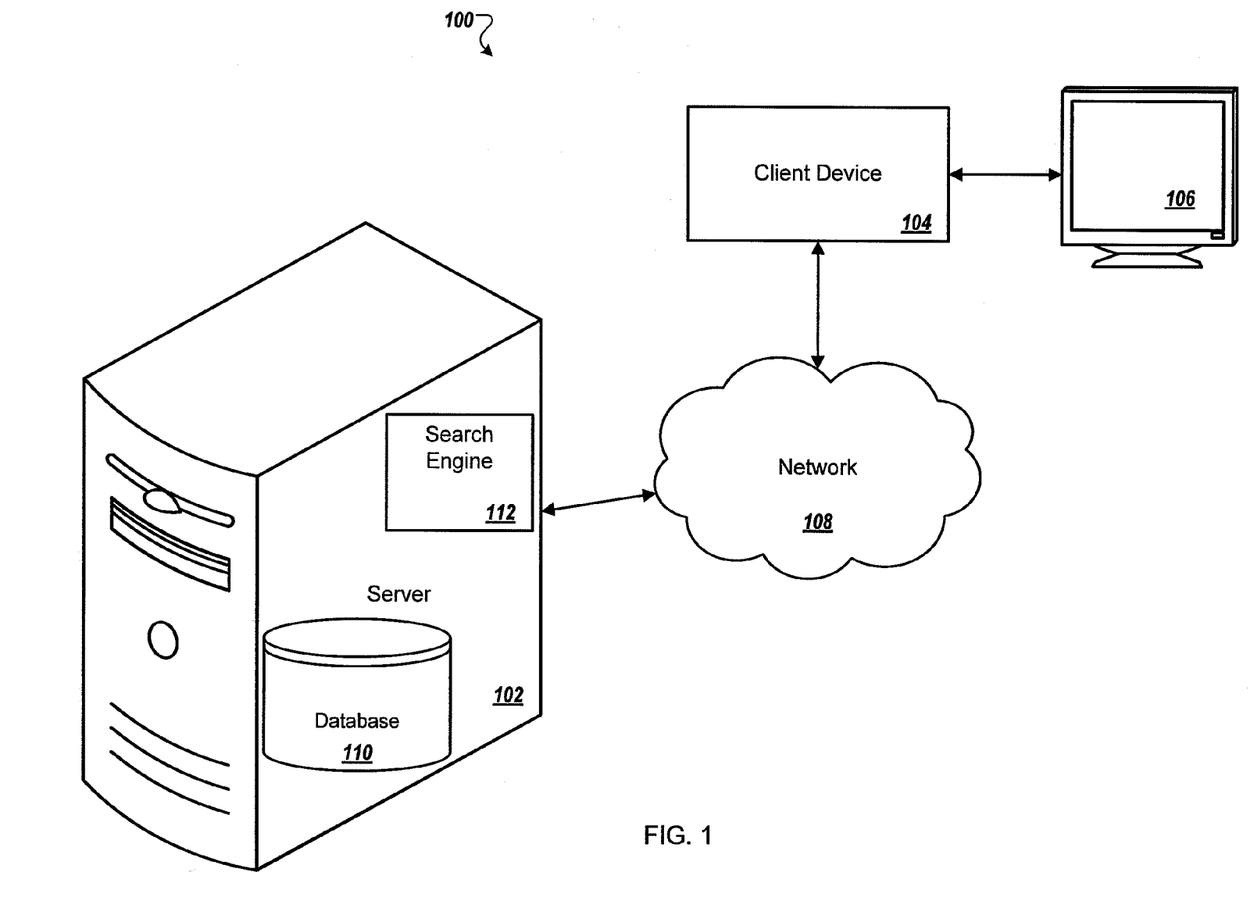
FIG. 1 is an example system for viewing product web pages.

FIG. 1 is an example of a system 100 for providing product web pages to a computing device. For example, the computing device requests a product web page from a server. The computing device includes or is connected to a display device and presents the product web page on the display device for viewing by a user.

The system 100 includes a server 102. The server 102, for example, contains information for an e-commerce company. The server 102 includes a database 110 or file system for storage of product information. For example, the server 102 stores information relating to web pages. The web pages are related to products or services offered by the e-commerce company. For example, the web pages include information about products sold by the e-commerce company. In some implementations, the web pages include information about the e-commerce company, information about products and services offered for free, or buying guides.

A client device 104 requests web pages from the server 102 for presentation to a user. For example, the client device 104 presents web pages in a browser on a display device 106. The client device 104 receives input from a user directing the client device 104 to a specific e-commerce web site. For example, a browser receives an URL address from the user. In some implementations, the client device 104 receives a query from the user and sends the query to the server 102. For example, the query is for products or services offered by the e-commerce company. A search engine 112 included in the server 102 processes the search query and determines product results related to the search query located on the database 110. The server 102 creates a web page with the query results and provides the web page to the client device 104. The client device 104 presents the web page on the display device 106.

In some implementations, the client device 104 is a desktop computer and the display device 106 is a liquid crystal display (LCD). The client device 104 is alternatively a laptop, tablet PC, smartphone, or a server. In some implementations, the display device 106 is built into the client device 104. For example, the display device 106 is a screen in a smartphone or a laptop.

In some implementations, the search engine 112 determines a correlation between the search query and topical information related to product categories. For example, the search engine 112 ranks the correlation between the search query and topical information related to the product categories stored in the server 102. The search engine 112 selects the topical information with the highest correlation to the search query and provides the topical information and product category information to the server 102. In some implementations, the server 102 creates a web page that includes both the topical information and product results from the product category related to the topical information. The server 102 provides the web page to the client device 104.

In some implementations, the server 102 receives a request from the client device 104 for a product specific web page. The server 102 includes product reviews (e.g., third party reviews and user reviews), product images (e.g., from a user), and comparable products on the product specific web page with product specific information.

In some implementations, a user of the client device 104 is able to add a review to the product specific web page. For example, the product specific web page includes an area for the user to enter and submit a review, as described in more detail below.

An array of product tiles (e.g., search results or comparable products) is included in the web page provided to the client device 104 by the server 102, as described in more detail below. When the web page is initially presented on the display device 106 the array of products tiles is substantially below a lower boundary of the display device 106 (e.g., and not presented on the display device 106). The client device 104 receives input from a user requesting to scroll down the web page. Scrolling of the web page allows the user to view the array of product tiles and select a product tile in order to view additional information related to the selected product tile. In some implementations, the ratio of the overall height to the overall width of the web page is at least about 4:1 or greater, e.g., the ratio is at least 6:1 or greater.

The client device 104 connects to the server 102 through a network 108. For example, the network 108 is a local area network, a wide area network, or the Internet. The client device 104 connects to the network 108 with a cable. In some implementations, the client device 104 connects to the network 108 wirelessly, e.g., with Bluetooth, IEEE 802.11, radio frequency, or a cellular network.

Figure 2A:
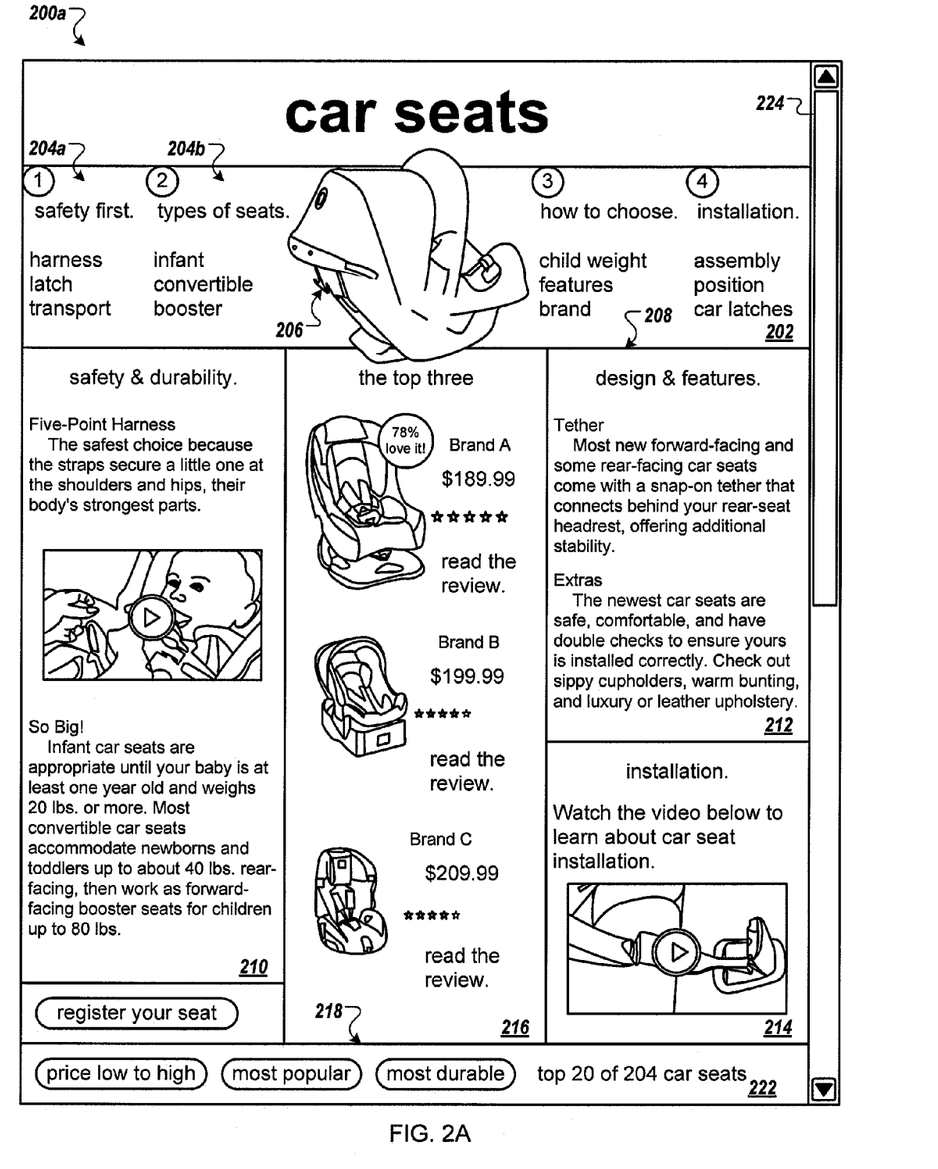
FIG. 2A is an example product category web page.

FIG. 2A is an example of a buying guide web page 200a showing a top region of the buying guide web page 200a (e.g., the scroll bar is in the upper most position). The buying guide web page 200a includes information relating to the product category (e.g., car seats). For example, the buying guide web page 200a includes buying guides for helping a user select a product to purchase from the product category. The buying guide web page 200a includes a tile array of products. For example, the buying guide web page 200a is presented after a user searches for a specific product category. Alternatively, a user browses to the buying guide web page 200a. When the buying guide web page 200a is initially presented on a display, the tile array of products exists on a portion of the buying guide web page 200a below a lower boundary of the display and is not presented on the display.

The buying guide web page 200a includes an upper portion 202. The upper portion includes one or more data tile regions 204a, 204b. Each of the data tile regions 204a, 204b includes information relating to the product category. For example, the data tile region 204a includes information about product safety and the data tile region 204b includes information about different sub-categories of the product category. In some implementations, the data tile regions 204a, 204b include information on how to choose a product from the product category, how to setup or install products from the product category, a list of common features of products in the product category, or a list of brands.

The upper portion 202 includes a main product image 206. The main product image 206 is a representation of a typical product from the product category. In some implementations, the main product image 206 is for a top rated or best selling product from the product category. In some implementations, the main product image 206 is for a product advertised by an e-commerce company that sells products from the buying guide web page 200a.

The buying guide web page 200a includes a middle portion 208. The middle portion 208 includes three columns. The left and right columns include topical information related to the product category. For example, the left column includes a safety and durability tile 210 and a link to register purchased car seats. The safety and durability tile 210 includes information on how to safely select and use products in the product category. For example, the safety and durability tile 210 includes information on how to safely select and use a car seat.

The right column includes a design and features tile 212 and an installation tile 214. The design and features tile 212 includes information relating to common features of products in the product category. For example, the design and features tile 212 includes information relating to car seat tethers and extras. The installation tile 214 includes information relating to installing a car seat into a vehicle. The installation tile 214 includes a video that provides instructions on how to install common car seats into a vehicle.

The center column includes information about the top products in the product category such as, in some examples, the best selling items, the highest rated items, or the highest rated items including a threshold number of ratings. For example, the center column includes a top three products tile 216. The top three products tile 216 includes general information about the top three products in the product category. In some implementations, more than three products are included in the top products listing. The top three products tile 216 includes one tile for each of the top three products in the product category. Each of the product tiles includes an image of the product and the price of the product. In some implementations, each of the product tiles includes a user rating of the product and a link to reviews of the product. Selection of one of the product tiles presents additional information about the selected product.

Figure 2B:
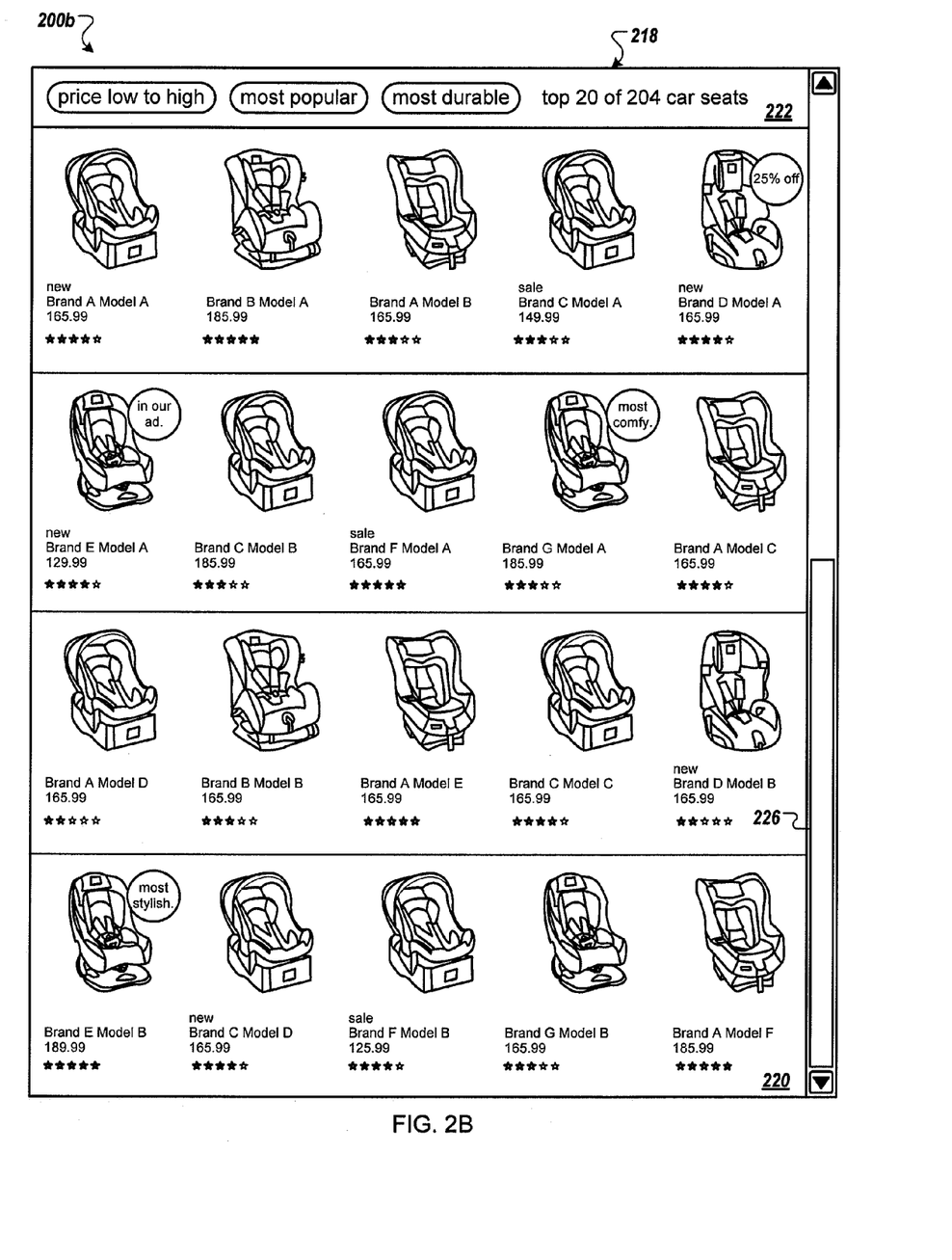
FIG. 2B is an example of the bottom portion of the product category web page of FIG. 2A.

FIG. 2B is an example of a buying guide web page 200b showing a bottom region of the buying guide web page 200b (e.g., the scroll bar is in the lowest position). The buying guide web page 200b is the same web page as the buying guide web page 200a with the scroll bar moved down.

The buying guide web page 200b includes a lower portion 218. The lower portion 218 includes information relating to products in the product category. For example, the lower portion 218 includes a tile array 220 of products in the product category. In some implementations, the tile array 220 presents the results of a search query. In some implementations, the tile array 220 presents all of the products from a product category, e.g., in response to a user navigating to the product category.

The tile array 220 includes information about the products presented in the tile array 220. For example, the tile array 220 includes the names and brands of the products. In some implementations, the tile array 220 includes product price and average user rating. In some implementations, the tile array 220 includes a link to view additional products (e.g., when only a subset of the products from the product category is presented on the buying guide web page 200b at one time).

The lower portion 218 optionally includes navigation options 222. The navigation options 222 allow a user to sort the products presented in the product array. For example, the navigation options 222 allow a user to sort the products from lowest to highest price, by popularity, by feature, or by sub-category type. In some implementations, the navigation options 222 filter out some of the products presented in the tile array 220. In some implementations, the lower portion 218 includes other menus or options to filter or sort the products in the tile array 220.

When the buying guide web page 200a is initially presented on a display (e.g., the display device 106) the tile array 220 exists substantially below a lower boundary of the display. For example a scroll bar included in a web browser is in a top position 224, as shown in FIG. 2A. When a computing device (e.g., the client device 104) connected to the display receives input indicating a selection and movement of the scroll bar, additional content on the buying guide web page 200a is presented on the display. For example, the computing device determines that a user scrolled to the bottom of the buying guide web page 200b and the scroll bar is in a bottom position 226, as shown in FIG. 2B. When the scroll bar is in the bottom position 226 the tile array 220 is presented on the display.

The placement of the tile array 220 at the bottom of the product category web page 220b directs a user to view all of the information on the product category web page 220b. For example, the user views the upper portion 202 and the middle portion 208 when the product category web page 220b is initially presented on a display.

Figure 3A:
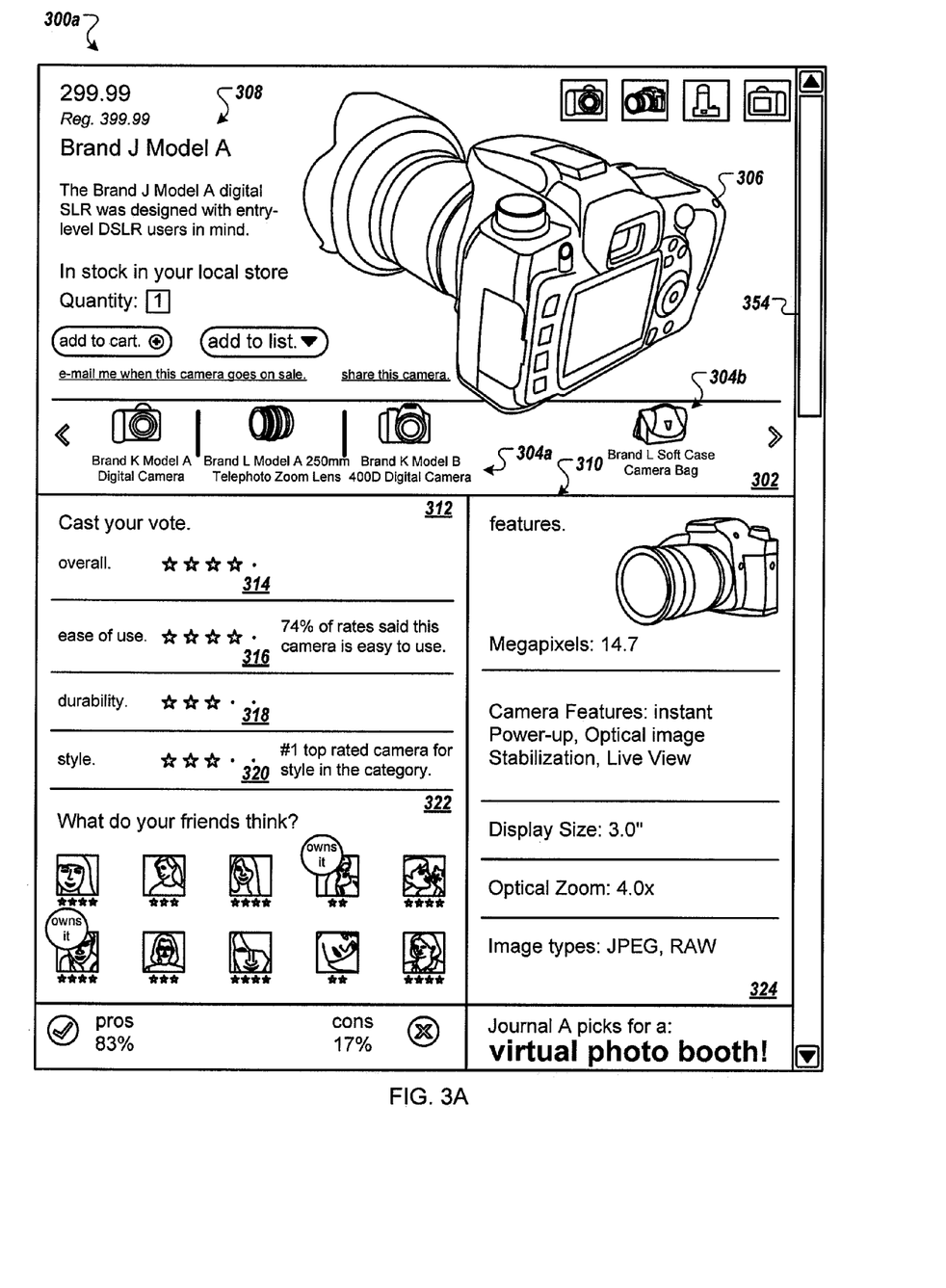
FIG. 3A is an example of a product specific web page.

FIG. 3A is an example of a product specific web page 300a. In some implementations, the product specific web page 300a is presented to a user after the user selects one of the product tiles from the tile array 220. The product specific web page 300a includes information relating to a specific product. For example, the product specific web page 300a includes a list of the product features, reviews, and information about related products.

The product specific web page 300a includes an upper region 302. The upper region 302 includes a horizontal rotating carousel with one or more product tile regions 304a, 304b. The horizontal rotating carousel includes a main product image 306 for the specific product described in the product specific web page 300a. The product tile regions 304a, 304b present information about products in the same product category as the product described in the product specific web page 300a. The horizontal rotating carousel allows a user to scroll through related products (e.g., a different product specific web page is presented to the user for each of the products in the horizontal product carousel).

The upper region 302 includes a product information region 308. The product information region 308 includes the price of the product, the name and brand of the product, and purchase information. For example, the product information region 308 includes information about the stock of the product in a store. In some implementations, a user creates an account with a web site and enters user information when creating the account (e.g., home address and preferred store). For example, a server (e.g., the server 102 as described in relation to FIG. 1) stores the user information and provides custom content to the user when the user views web pages associated with the web site (e.g., product stock levels at the preferred store and shipping information).

The product information region 308 includes a quantity box which allows a user to enter the quantity of the product they will purchase. The product information region 308 includes an add to cart button and an add to list button that allow a user to add the specified quantity of the product to the user's shopping cart for later purchase or to add the product to a wish list respectively.

The product information region 308 includes an email me when this camera goes on sale link and a share this camera link. The share this camera link allows a user to send information relating to the product to one or more users socially connected to the user.

In some implementations, the upper region 302 includes thumbnail images of the product which allow a user to change the main product image 306. For example, thumbnail images of the product are located in the top right corner of the upper region 302.

The product specific web page 300a includes a middle region 310. The middle region includes two columns for presenting information to a user. The left column includes a widget bar 312 that receives input from the user indicating their rating of the product presented in the product specific web page 300a. For example, an overall rating tile 314 receives input from a user indicating their overall rating of the product. An ease of use tile 316 receives input from a user indicating how easy the product is to use. In some implementations, the ease of use tile 316 presents information indicating the average ease of use rating. A durability tile 318 receives input from a user indicating how durable the product is. A style tile 320 receives input from a user indicating how stylish a user thinks the product is. In some implementations, the style tile 320 presents information about the average rating of the product or the overall category rating. For example, the style tile 320 presents information indicating that the presented product is the top rated product in the product category (e.g., that the camera is the number one top rated camera for style).

The left column includes a socially connected user ratings tile 322. The socially connected user ratings tile 322 indicates user ratings of the product provided by people socially connected to a user viewing the product specific web page 300a. The socially connected user ratings tile 322 indicates which people socially connected to the user own the product presented in the product specific web page 300a. The socially connected user ratings tile 322 includes icons showing pictures of the people socially connected to the user who provided ratings of the product. Below each of the icons is the user rating associated with the person depicted in the icon. In some implementations, the icons present graphical art selected by the person. In some implementations, information about a person is presented in the product specific web page 300a when a user hovers a cursor over the icon of the person.

In some implementations, the socially connected user ratings tile 322 changes when a cursor hovers over the different sections in the widget bar 312. For example, when a cursor hovers over the ease of use tile 316, the socially connected user ratings tile 322 shows the ease of use ratings provided by people socially connected to the user. When the cursor hovers over the style tile 320, the socially connected user ratings tile 322 presents the product style ratings provided by people socially connected to the user.

The right column includes a detailed product information tile 324. The detailed product information tile 324 provides detailed information about the product presented on the product specific web page 300a. For example, the detailed product information tile 324 includes the megapixels, display size, optical zoom, image types, and camera features of the product.

In other implementations, the ratings tile 322 and the product information tile 324 are stacked upon each other in two rows of information. For example, the two rows of information can span the entire width of the right column plus the left column.

Figure 3B:
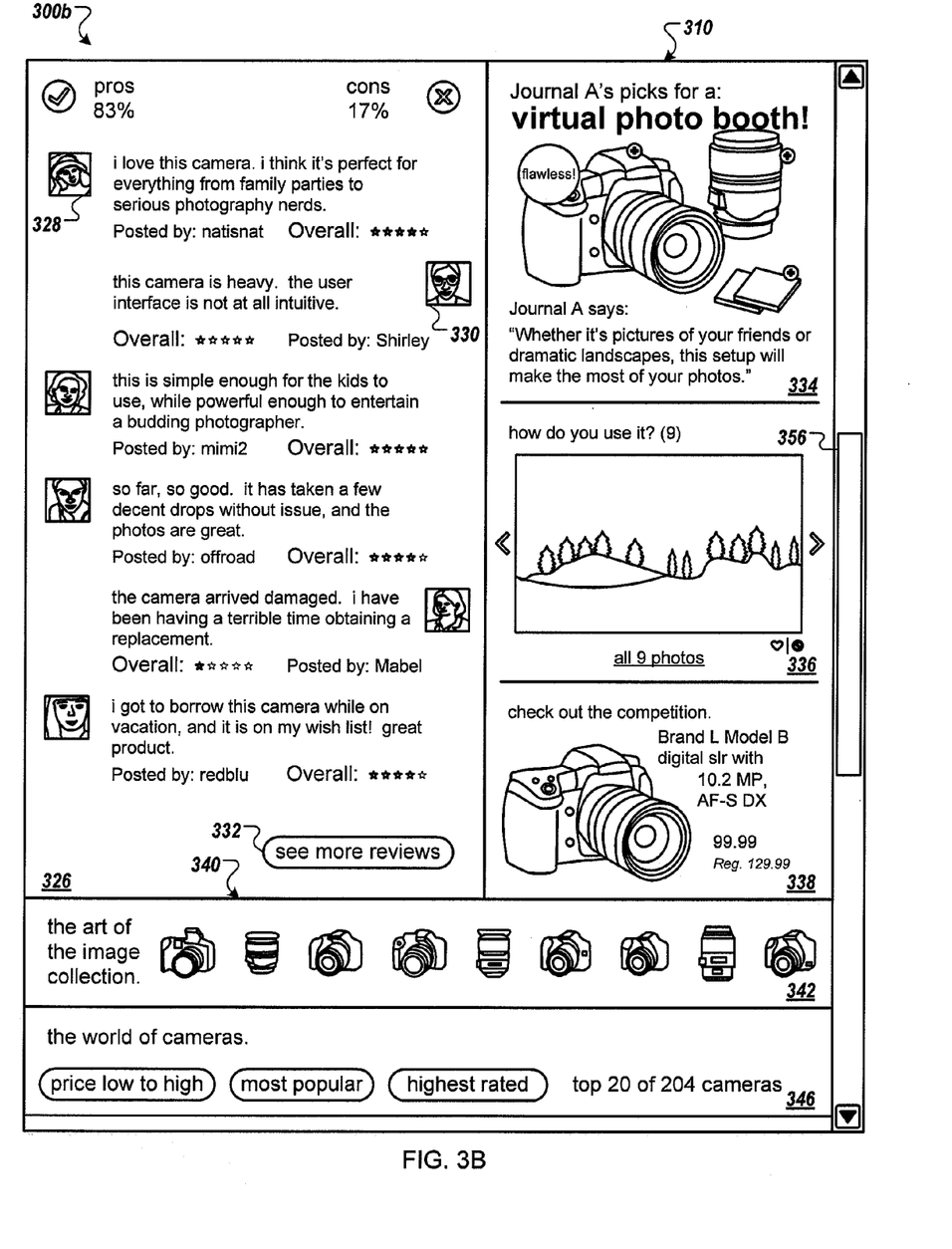
FIG. 3B is an example of the middle portion of the product specific web page of FIG. 3A.

FIG. 3B is an example of a product specific web page 300b scrolled partially down. In some implementations, the product specific web page 300b is the same web page as the product specific web page 300a presenting different information to a user. For example, the product specific web page 300a contains more information than a display (e.g., the display device 106 as described in relation to FIG. 1) is able to present to a user at the same time.

The left column of the middle region 310 includes a reviews tile 326. The reviews tile 326 includes reviews of the product presented on the product specific web page 300b. For example, the reviews tile 326 includes a positive review column and a negative review column. The headings for the positive review column and the negative review column indicate the total percentage of reviews that are positive and negative respectively. For examples, a first positive review includes a first user icon 328 of a user providing the review. The first user icon 328 is in the positive review column indicating that the review is positive. A first negative review includes a second user icon 330 positioned in the negative review column indicating that the review is negative. In some implementations, the user icons are images of the user writing the review. In some implementations, the icons are graphical art specified by the user writing the review.

The reviews tile 326 includes a see more reviews button 332. For example, the see more reviews button 332 presents a list of all the user reviews of the product described on the product specific web page 300b.

The right column of the middle region 310 includes a third party review tile 334. For example, the third party review tile 334 includes a summary of a review provided by a third party, e.g., a professional review by a person not associated with the e-commerce company that provides the product specific web page 300b. In some implementations, the third party review tile 334 includes an image of the product provided by the third party. In some implementations, the third party review tile 334 includes a link to the entire review provided by the third party, e.g., when the entire review is not presented on the product specific web page 300b. In some implementations, the third party review tile 334 includes a third party rating or recommendation of the product.

The right column includes a user photos tile 336. The user photos tile 336 includes images of the product that are uploaded by one or more users. In some implementations, the images show people using the product described on the product specific web page 300b. In some implementations, the images are from a social networking site associated with the e-commerce company that provides the product specific web page 300b. In some implementations, the user photos tile 336 includes images taken by the product (e.g., when the product includes a camera feature).

The right column includes a comparable product tile 338. The comparable product tile 338 includes information about a product that is similar to the product described on the product specific web page 300b. For example, the comparable product tile 338 includes the name, brand, and price of a camera that is similar to the camera described on the product specific web page 300b.

Figure 3C:
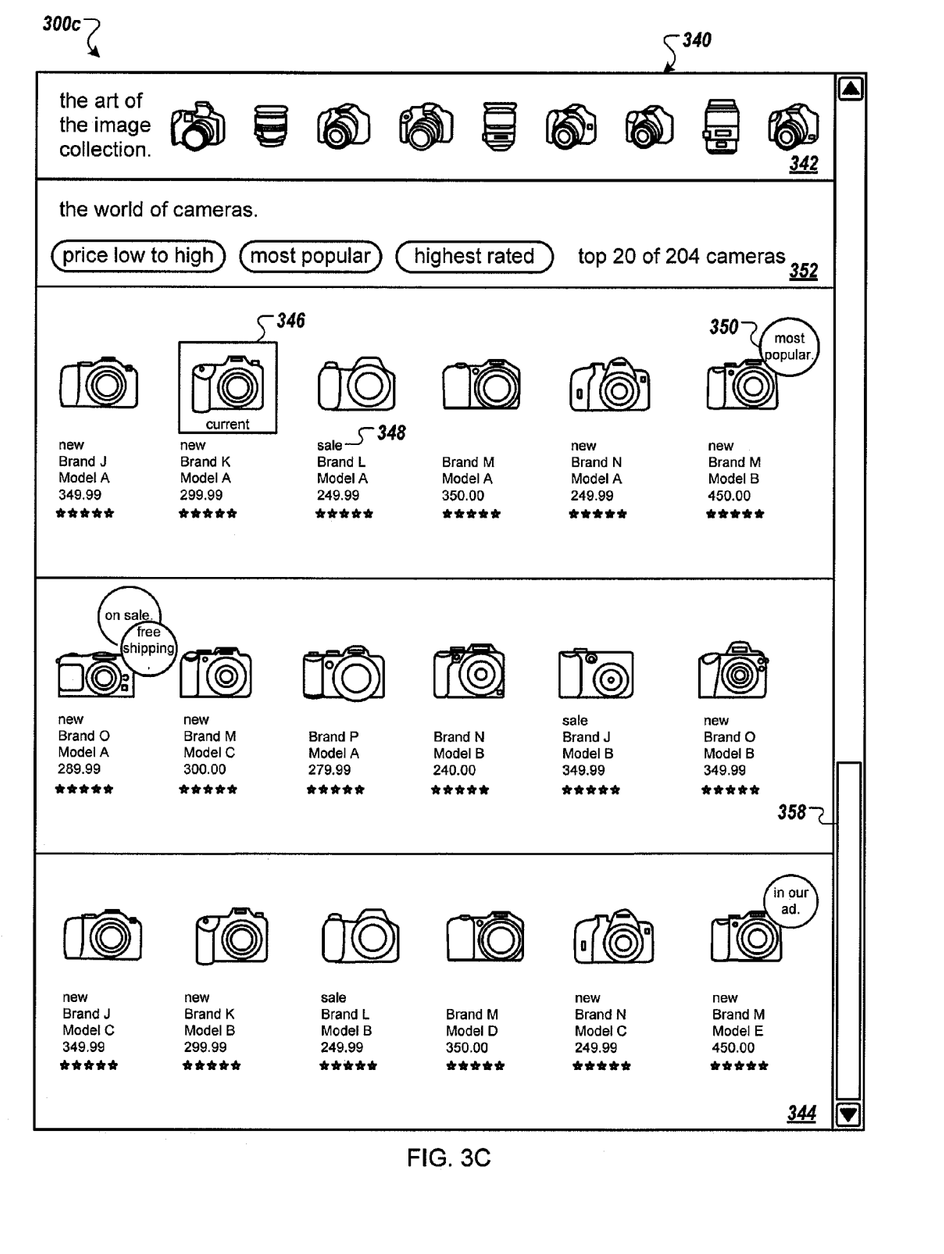
FIG. 3C is an example of the bottom portion of the product specific web page of FIG. 3A.

FIG. 3C is an example of a product specific web page 300c. In some implementations, the product specific web page 300c is the same web page as the product specific web page 300b scrolled down to the bottom of the web page.

The product specific web page 300c includes a lower region 340. The lower region 340 includes a product category information tile 342. The product category information tile 342 provides a link to topical information related to the product category of the product described on the product specific web page 300c. For example, the product category information tile 342 provides a link to the buying guide web page 200a, described in relation to FIG. 2A.

The lower region 340 includes a comparable product tile array 344. The comparable product tile array 344 includes information about products related to the product described on the product specific web page 300c. For example, the comparable product tile array 344 presents information about products that are in the same product category as the product described on the product specific web page 300c. In some implementations, the comparable product tile array 344 only presents a subset of the products from the product category of the product presented on the product specific web page 300c. For example, the comparable product tile array 344 includes a link to view additional products in the product category (e.g., a next page button).

When the product described on the product specific web page 300c is presented in the comparable product tile array 344, a current product box 346 is presented indicating the product currently presented on the product specific web page 300c.

The comparable product tile array 344 includes information indicating product names, brands names, and product prices. In some implementations, the comparable product tile array 344 includes user ratings for each of the products in the array (e.g., when the products have a rating).

The comparable product tile array 344 includes a product status indicator 348 for each of the products. For example, the product status indicator 348 indicates if a product is new (e.g., the e-commerce site selling products using the product specific web page 300c just started to sell the product), if a product is on sale, if a product is advertised, if a product is out of stock, if a product is no longer carried, or if a product is on clearance.

In some implementations, a product image in the comparable product tile array 344 includes an information tag 350. For example, the information tag 350 presents product advertising, such as indicating that the product is on sale, has free shipping, was displayed in an ad, is a specific percentage off, or has a highest user rating in a specific category (e.g., style, comfort, or ease of use).

The lower region 340 includes a product filter tile 352. The product filter tile 352 allows a user to filter or sort the products presented in the comparable product tile array 344. For example, the product filter tile 352 allows a user to sort the product from lowest price to highest price, by popularity, or by rating.

In some implementations, the product specific web page 300c is presented after a user selects a product presented in the tile array 220 (illustrated in FIG. 2A). For example, the tile array 220 and the comparable product tile array 344 present the same information. Selection of one of the product tiles when viewing the buying guide web page 200a illustrated in FIG. 2A changes the information on the upper portion of the web page (e.g., the upper portion 202 and the middle portion 208, both described in relation to FIG. 2A, are replaced with the upper portion 302 described in relation to FIG. 3A and the middle portion 310 described in relation to FIG. 3B).

In some implementations, a ratio of the overall height to the overall width of the product specific web page 300c is at least about 4:1 or greater, e.g., 5:1 or greater. For example, a display (e.g., the display device 106 illustrated in FIG. 1) presents a portion of the product specific web page 300c at a single time. In some implementations, the product specific web page 300a is initially presented on the display when the web page is loaded in a browser. The browser receives input indicating a user is scrolling down the web page and presents the product specific web page 300b. After receiving further input indicating additional scrolling, the display presents the product specific web page 300c.

For example, when the product specific web page 300a is initially presented a scroll bar to the right of the web page is in an upper position 354, as shown in FIG. 3A. After a computing device (e.g., the client device 104) receives input indicating scrolling down the web page, the scroll bar is in a middle position 356, as shown in FIG. 3B. Additional scrolling places the scroll bar in a lower position 358, as shown in FIG. 3C.

Placement of the comparable product tile array 344 at the bottom of the product specific web page 300a directs a user to scroll through the content presented on the product specific web page 300a and view all of the content. In some implementations, the location of the comparable product tile array 344 facilitates more user interaction with the content presented above the comparable product tile array 344.

Figure 4:
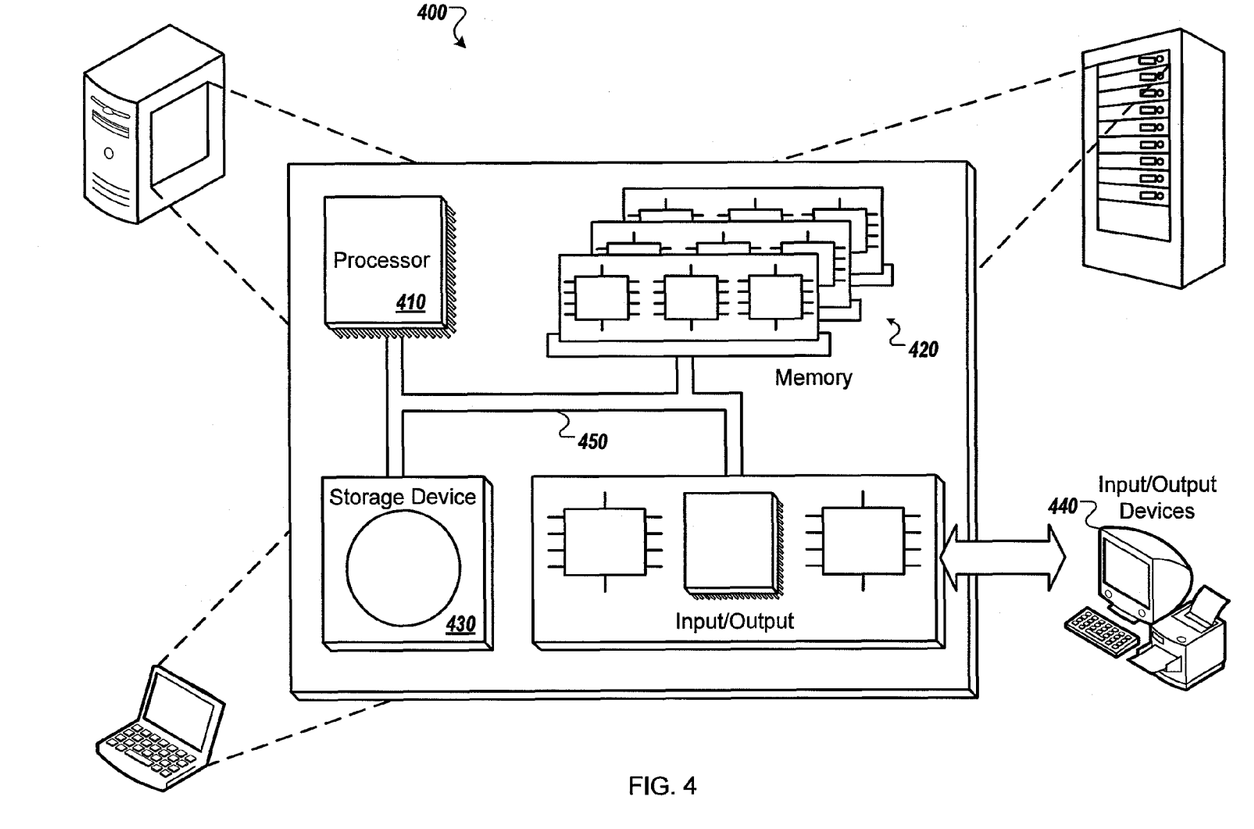
FIG. 4 is a block diagram of a computing system optionally used in connection with computer-implemented methods described in this document.

FIG. 4 is a schematic diagram of a generic computer system 400. The system 400 is optionally used for the operations described in association with any of the computer-implemented methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 is optionally a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A computer-implemented method of rendering a web page on at least one display, the computer-implemented method including the step of:
   operating one or more computers to render a first web page, the first web page including:
   an upper region including a horizontal informational bar including a plurality of data tile regions and a main product image extending beyond an upper border or a lower border of the horizontal information bar and having an image size substantially larger than a tile region size of any data tile region, the main product image visually depicting a main product, the main product being of a main product within a product category and being generally centrally positioned on the horizontal informational bar, each of the data tile regions including product information associated with the product category;
   a middle region positioned below the upper region comprised of three generally parallel and vertical column sub-regions, the column sub-regions including a middle sub-region, a left sub-region, and a right sub-region, wherein the middle sub-region displays a recommended product image visually depicting one or more recommended products in a vertical array of product tile regions, and wherein each of the left sub-region and the right sub-region include one or more information tiles containing topical information relating to the product category; and
   a lower region positioned below the middle region comprising an array of product tiles, each product tile having a respective thumbnail image of a respective product selected from the product category coupled with respective product information, the thumbnail image being a visual depiction of the respective product; and
   the first web page being configured such that upon activation of a first portion of the first web page a second web page is generated, the second web page including one or more user reviews, and
   wherein the user reviews are categorized into two or more product categories; and
   wherein a subset of the user reviews presented on the second web page are selected based in part upon the product category of a user review section hovered over by a cursor, the user review section being a portion of the user reviews.

2. The method of claim 1, wherein a ratio of overall height to overall width of the first web page is at least about 4:1 or greater and wherein the array of product tiles exists substantially below a lower boundary viewable on a conventional display monitor when the display is at an uppermost scroll position.

3. The method of claim 2, wherein the recommended products displayed in the middle sub-region of the first web page include one or more top rated products or best selling products selected from the product category.

4. The method of claim 2, wherein the recommended products displayed in the middle sub-region of the first web page include one or more of a user rating or a link to a review of a respective recommended product.

5. The method of claim 2, wherein the array of product tiles presents all products from the product category.

6. The method of claim 2, wherein the array of product tiles includes one or more of a product price or an average user rating.

7. The method of claim 2, wherein the lower region of the first web page includes one or more navigation options.

8. A system comprising: one or more computers configured to generate a graphical user interface for a retail environment on at least one display, the graphical user interface including:
   a vertical scroll means;
   an upper region including a horizontal rotating carousel including a plurality of product tile regions and a main product image extending beyond an upper border or a lower border of the horizontal rotating carousel and having an image size substantially larger than a tile region size of any product tile region, the main product image visually depicting a main product, the main product image being of a main product within a product category, each of the product tile regions including a respective thumbnail image visually depicting a respective product within the product category, the horizontal rotating carousel being configured to allow a user to scroll horizontally through the plurality of product tile regions;

a middle region positioned below the upper region comprised of two generally parallel and vertical column sub-regions, the column sub-regions including a left sub-region and a right sub-region, wherein the left sub-region displays a widget bar including one or more user reviews from one or more socially networked users being socially networked with the web page user, and one or more aggregate customer reviews, the widget bar being configured to accept category reviews from a web page user, wherein the user reviews are categorized into two or more product categories; and wherein a subset of the user reviews presented on the web page are selected based in part upon the product category of a user review section hovered over by a cursor, the user review section being a portion of the user reviews, and wherein the right sub-region comprises one or more detailed features of the main product, one or more third party recommendations about the main product, one or more product images showing customers using the main product; and a comparable alternative product tile; and a lower region positioned below the middle region comprising an array of product tiles, each product tile having a respective thumbnail image of a respective alternative product selected from the product category, the thumbnail image being a visual depiction of the respective alternative product, wherein a ratio of overall height to overall width of the graphical user interface is at least about 4:1 or greater, wherein the array of product tiles exists substantially below the lower boundary viewable on a conventional display monitor when the vertical scroll means is at an uppermost scroll position.

9. The system of claim 8, wherein the upper region includes one or more thumbnail images of the main product which allow the web page user upon selection to change the main product image.

10. The system of claim 8, wherein the upper region includes a product information region.

11. The system of claim 10, wherein the product information region includes one or more of a quantity box, a shopping cart link configurable upon selection to allow the web page user to add the main product to a shopping cart, a desired products link configurable upon selection to allow the web page user to add the main product to a desired products list, a notify link configurable upon selection to instruct a retail enterprise to notify the web page user by email when the main product is on sale, or a share link configurable upon selection to allow the web page user to share information regarding the main product with one or more additional users.

12. The system of claim 8, wherein each respective user review includes a respective icon.

13. The system of claim 8, wherein the third party recommendations each include a review link to a respective complete review provided by a respective third party.

14. The system of claim 8, wherein the one or more product images are obtained from at least one social networking site.

15. The system of claim 8, wherein the lower region further comprises a product category information tile.

16. The system of claim 8, wherein the lower region further comprises a product filter tile.

17. The system of claim 8, wherein the array of product tiles comprising the lower region includes one or more of a user rating tile or an information tile.

18. The system of claim 8, wherein the right sub-region further comprises one or more camera images captured using a camera feature of the main product.

19. A computer-implemented method of rendering one or more web pages on at least one display, the computer-implemented method including the step of:

operating one or more computers to render a first web page, the first web page including:

an upper region including a horizontal informational bar including a plurality of data tile regions and a main product image extending beyond an upper border or a lower border of the horizontal information bar and having an image size substantially larger than a tile region size of any data tile region, the main product image visually depicting a main product, the main product being of a main product within a product category and being generally centrally positioned on the horizontal informational bar, each of the data tile regions including product information associated with the product category;

a middle region positioned below the upper region comprised of three generally parallel and vertical column sub-regions, the column sub-regions including a middle sub-region, a left sub-region, and a right sub-region, wherein the middle sub-region displays a recommended product image visually depicting one or more recommended products in a vertical array of product tile regions, and wherein each of the left sub-region and the right sub-region include one or more information tiles containing topical information relating to the product category; and a lower region positioned below the middle region comprising an array of product tiles, each product tile having a respective thumbnail image of a respective product selected from the product category coupled with respective product information, the thumbnail image being a visual depiction of the respective product, the lower region being configured such that upon selection by a user of any of the product tiles, a second web page is generated specific to the respective product of the selected product tile, the second web page including a vertical scroll means, an upper region, a middle region and a lower region;

the upper region of the second web page having a horizontal rotating carousel including a plurality of product tile regions and a main product image extending beyond an upper border or a lower border of the horizontal rotating carousel and having an image size substantially larger than a tile region size of any product tile region, the main product image visually depicting a main product, the main product image being of a main product within a product category, each of the product tile regions including a respective thumbnail image visually depicting a respective product within the product category, the horizontal rotating carousel being configured to allow a user to scroll horizontally through the plurality of product tile regions;

the middle region of the second web page being positioned below the upper region of the second web page and includes two generally parallel and vertical column sub-regions, the column sub-regions including a left sub-region and a right sub-region, wherein the left sub-region displays a widget bar including one or more user reviews from one or more socially networked users being socially networked with the web page user, and one or more aggregate customer reviews, the widget bar being configured to accept category reviews from a web page user, wherein the user reviews are categorized into two or more product categories; and wherein a subset of the user reviews presented on the second web page are selected based in part upon the product category of a user review section hovered over by a cursor, the user review section being a portion of the user reviews, and wherein the right sub-region comprises one or more detailed features of the main product, one or more third party recommendations about the main product, one or more product images showing customers using the main product; and a comparable alternative product tile; and the lower region of the second web page being positioned below the middle region and comprising an array of product tiles, each product tile having a respective thumbnail image of a respective alternative product selected from the product category, the thumbnail image being a visual depiction of the respective alternative product.

* * * * *